US00RE43981E

(19) United States
(12) Reissued Patent
Endelman

(10) Patent Number: US RE43,981 E
(45) Date of Reissued Patent: Feb. 5, 2013

(54) CONVERTIBLE BARREL EXERCISE APPARATUS

(75) Inventor: Ken Endelman, Sacramento, CA (US)

(73) Assignee: Balanced Body, Inc., Sacramento, CA (US)

(21) Appl. No.: 13/187,317

(22) Filed: Jul. 20, 2011

Related U.S. Patent Documents

Reissue of:
(64) Patent No.: 7,563,217
Issued: Jul. 21, 2009
Appl. No.: 11/853,767
Filed: Sep. 11, 2007

U.S. Applications:
(63) Continuation-in-part of application No. 11/271,584, filed on Nov. 10, 2005, now Pat. No. 7,452,313.

(51) Int. Cl.
*A63B 26/00* (2006.01)

(52) U.S. Cl. ..... 482/142; 482/140; 482/23; 482/121

(58) Field of Classification Search ..... 482/140, 482/23, 142, 139, 907, 91–93, 95–96, 148; 446/120–122, 124, 128
See application file for complete search history.

(56) References Cited

U.S. PATENT DOCUMENTS

| | | | | | |
|---|---|---|---|---|---|
| 2,264,004 | A | * | 11/1941 | Patterson et al. | 148/526 |
| 2,264,046 | A | * | 11/1941 | McClellan | 482/145 |
| 2,783,045 | A | * | 2/1957 | Bosch | 482/96 |
| 3,660,928 | A | * | 5/1972 | Michel | 446/124 |
| D275,213 | S | * | 8/1984 | Johnson | D21/690 |
| 4,693,470 | A | * | 9/1987 | Ogawa | 482/79 |
| 4,834,072 | A | * | 5/1989 | Goodman | 601/35 |
| 4,867,142 | A | * | 9/1989 | Jones | 601/115 |
| 4,953,857 | A | * | 9/1990 | Lemire | 482/142 |
| 5,007,633 | A | * | 4/1991 | Lemire | 482/142 |
| D326,913 | S | * | 6/1992 | Staples | D24/188 |
| 5,137,333 | A | * | 8/1992 | Chee | 297/452.21 |
| 5,212,842 | A | * | 5/1993 | Glydon | 5/420 |
| 5,304,109 | A | * | 4/1994 | Shockley | 482/142 |
| 5,318,489 | A | * | 6/1994 | Irwin | 482/52 |
| D353,173 | S | * | 12/1994 | Almeda | D21/687 |
| D360,796 | S | * | 8/1995 | Goldado | D6/601 |
| 5,462,509 | A | * | 10/1995 | Lister | 482/132 |
| 5,584,786 | A | * | 12/1996 | Almeda | 482/142 |
| 5,645,511 | A | * | 7/1997 | Le Roux et al. | 482/52 |
| 5,722,102 | A | * | 3/1998 | Summers | 5/630 |
| 5,722,923 | A | * | 3/1998 | Lui | 482/140 |

(Continued)

FOREIGN PATENT DOCUMENTS

| | | | |
|---|---|---|---|
| JP | 10-117916 | | 5/1998 |
| JP | 2002315767 | * | 5/1998 |

(Continued)

OTHER PUBLICATIONS

International Search Report and Written Opinion, dated Aug. 14, 2007, from co-owned International Application No. PCT/US2006/42995.

(Continued)

*Primary Examiner* — Lori Baker
(74) *Attorney, Agent, or Firm* — Greenberg Traurig, LLP

(57) ABSTRACT

A barrel exercise apparatus in accordance with the present disclosure is a curved, partial barrel shaped body that has an upper curved surface having two portions with different radii of curvature. A removable step block may be included and may be attached to the barrel shaped body.

18 Claims, 4 Drawing Sheets

U.S. PATENT DOCUMENTS

| | | | | | |
|---|---|---|---|---|---|
| 5,755,647 | A * | 5/1998 | Watnik | 482/121 |
| 5,795,276 | A * | 8/1998 | Almeda | 482/142 |
| 5,797,861 | A * | 8/1998 | Port | 601/134 |
| D400,386 | S * | 11/1998 | Keilhauer | D6/601 |
| 5,882,284 | A * | 3/1999 | Cayne | 482/130 |
| 5,897,472 | A * | 4/1999 | Thulasingam | 482/133 |
| 5,899,838 | A * | 5/1999 | Jacobs | 482/142 |
| 5,925,003 | A * | 7/1999 | Vincent et al. | 601/134 |
| D430,627 | S * | 9/2000 | Bergman | D21/686 |
| 6,634,999 | B2 * | 10/2003 | Herbst | 482/142 |
| 6,705,797 | B1 * | 3/2004 | Wada | 404/38 |
| 6,725,481 | B1 * | 4/2004 | Marshall | 5/650 |
| 6,755,771 | B2 * | 6/2004 | Wallerstein | 482/140 |
| 6,892,810 | B2 * | 5/2005 | Austbo et al. | 166/85.5 |
| 6,988,979 | B1 * | 1/2006 | Trainor | 482/142 |
| D521,301 | S * | 5/2006 | Dickson | D6/601 |
| D526,033 | S * | 8/2006 | Van Straaten et al. | D21/688 |
| 7,203,983 | B1 * | 4/2007 | Reeves et al. | 5/636 |
| D555,741 | S * | 11/2007 | Wachtfogel et al. | D21/686 |
| 7,452,313 | B2 * | 11/2008 | Endelman | 482/140 |
| 7,563,217 | B2 * | 7/2009 | Endelman | 482/142 |
| 2004/0033873 | A1 * | 2/2004 | Van Straaten | 482/142 |
| 2004/0142801 | A1 * | 7/2004 | Lin | 482/142 |
| 2004/0226096 | A1 * | 11/2004 | Davis | 5/632 |
| 2006/0040811 | A1 * | 2/2006 | Foster | 482/142 |
| 2006/0116262 | A1 * | 6/2006 | Pandozy | 482/142 |

FOREIGN PATENT DOCUMENTS

| | | |
|---|---|---|
| JP | 2002-315767 | 10/2002 |
| KR | 20-0397461 | 10/2005 |

OTHER PUBLICATIONS

International Search Report and Written Opinion, dated Jun. 4, 2008, from co-owned International Application No. PCT/US2007/087098.

Peak Body Systems, Inc., "Instep Barrel System," 2 pages, retrieved from the Internet on Jun. 25, 2007 at http://www.peakpilates.com/store/prd_page.cfm?ID=5&CATID=1, 2006.

Balanced Body, Inc. Online Catalog, "Pilates Ladder Barrel," 2 pages, retrieved from the Internet on Sep. 11, 2007 at http://www.pilates.com/BBAPP/V/equipment/ladder-barrel.html, 2007.

Balanced Body, Inc. Online Catalog, "Pilates Arc and Step Barrel (Spine Corrector)," 5 pages, retrieved from the Internet on Sep. 11, 2007 at http://www.pilates.com/BBAPP/V/equipment/stepbarrel-arc.html, 2007.

Extended European Search Report, dated Dec. 20, 2011, from related European Patent Application No. 07865515.6.

Office Action, dated Dec. 22, 2011, from related Korean Patent Application No. 10-2010-7007850.

International Search Report and Written Opinion from International Application No. PCT/US2007/087098.

Peak Body Systems, Inc., Internet web site, "Instep Barrel System" 2006, http://www.peakpilates.com/store/prd_page.cfm?ID=5&CATID=1.

Balanced Body, Inc. Online Catalog, "Ladder Barrel," 2 pages, 2007, http://www.pilates.com/BBAPP/V/equipment/ladder-barrel.html.

Balanced Body, Inc. Online Catalog, "Arc and Step Barrel," 5 pages, 2007, http://www.pilates.com/BBAPP/V/equipment/stepbarrel-arc.html.

* cited by examiner

CONVERTIBLE BARREL EXERCISE APPARATUS

Matter enclosed in heavy brackets [ ] appears in the original patent but forms no part of this reissue specification; matter printed in italics indicates the additions made by reissue.

RELATED APPLICATION

This application is a continuation-in-part of U.S. patent application Ser. No. 11/271,584, filed Nov. 10, 2005 *now U.S. Pat. No. 7,452,313*, the contents of which are incorporated by reference herein in its entirety.

BACKGROUND

1. Field

This disclosure relates to an exercise apparatus and more particularly to a partial barrel apparatus for use in Pilates exercises.

2. General Background

Joseph H. Pilates originally developed the concept of using a wheeled platform carriage connected to a resistance device such as a set of weights in conjunction with a stationary frame to provide a variable resistance against which a user could push with his/her feet or pull with the arms while in a sitting or recumbent position in order to exercise the major muscle groups of the user's trunk, legs and/or arms. He and his wife Clara developed and used various exercise apparatus in their pioneering work that has become generally known as Pilates training. One of the exercise devices that Clara Pilates developed she called a "spine corrector". This device has the shape of a padded partial segment of a cylindrical barrel that merges into a flat, inclined plane, or step, hence the name "step barrel" as it is commonly known today. A user would sit on the step and lean back over the curved surface of the barrel portion, stretching the user's spine.

Since that time many changes and improvements in the design of step barrels have occurred. Handles have been added on the vertical sides, and simplified versions have been developed, called "Baby Arcs", which are smaller arc segments formed either of wood or plastic and often covered with a padded upholstery material.

Step barrels, however, have a disadvantage in that they are formed with one fixed radius for the curved surface of the barrel portion. One user may find the curvature of the barrel portion too sharp, while another user may find the curvature of the barrel too shallow. This requires the use of at least two barrels and arcs with different curvatures for different users and thus barrels of different sizes have been developed. However, studio space, and hence storage space is usually limited in most facilities where these devices are used. Accordingly, there is a need for a step barrel exercise apparatus that can accommodate different users without taking up additional space. Also, there is a need for an exercise apparatus that can accommodate a variety of different configurations, depending on the physique of the user, as well as different exercises.

It is with these needs in mind that the apparatus in accordance with the present disclosure has been developed.

SUMMARY

One embodiment of the barrel exercise apparatus in accordance with the present disclosure is a curved, partial barrel shaped body that has a bottom surface shaped to rest on a portion of a planar surface such as a pad or a floor and an upper curved surface formed by a first cylindrical surface portion having a first radius of curvature about a first axis and a second cylindrical surface portion having a second radius of curvature about a second axis spaced from and parallel to the first axis. The second radius is different from the first radius of curvature. The first and second surface portions preferably tangentially merge together to form a continuous smooth, curved, upper surface.

Another embodiment of a barrel exercise apparatus in accordance with the present disclosure is an assembly that includes a planar base such as a non-slip mat, a removable first block shaped body having a bottom surface shaped to rest on the base, a generally flat top surface lying at an acute angle to a plane of the bottom surface of the block shaped body when the first body is positioned on the base, and an upright front edge between the bottom surface and the top surface. The assembly also has a curved second body removably abutting the upright front edge of the first section on the planar base. This second curved, partial barrel shaped body has a bottom surface shaped to rest on at least a portion of the planar base, and an upper curved surface formed by a first cylindrical portion having a first radius of curvature about a first cylinder axis and a second cylindrical portion having a second radius of curvature about a second cylinder axis spaced from and parallel to the first axis. The second radius is different from the first radius of curvature. The first and second surface portions merge together to form a continuous smooth curved generally cylindrical upper surface. The second body may be positioned with either the first portion or the second portion abutting the first body on the base.

The barrel exercise apparatus assembly of this embodiment also preferably includes a removable locating member positioned on the planar base that extends into a complementary shaped curved recess in the bottom surface of the second body. The recess is preferably shaped to receive the removable locating member so that the second body may be properly oriented on the planar base in one of preferably two possible positions. Preferably the curved recess is arcuately curved about an axis parallel to the first and second axes.

Another embodiment of a barrel exercise apparatus in accordance with the present disclosure is an assembly comprising a curved partial cylindrical barrel shaped body having a bottom surface, an upper curved surface, a first end face, a second end face, and a rear wall between the bottom surface and upper curved surface. The upper curved surface is formed by a first cylindrical surface portion having a first radius of curvature about a first axis merging with a second cylindrical surface portion having a second radius of curvature to form a continuous smooth curved surface. The first radius of curvature is different from the second radius of curvature. The first and second axes together define a plane through a line of intersection of the first and second cylindrical surface portions. The rear wall has at least one recess to form a tongue and groove configuration.

The exercise apparatus also includes a removable step block having a bottom surface, a top, and an upright front wall between the bottom surface and the top surface. The upright front wall has at least one recess to form a complementary tongue and groove configuration to engage the tongue and groove configuration of the edge of the curved partial cylindrical barrel shaped body. The step block is removably connected to the partial cylindrical barrel body through engagement of the tongue and groove configuration of the rear wall of the curved partial cylindrical barrel shaped body with the complementary tongue and groove configuration of the upright front wall of the step block.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
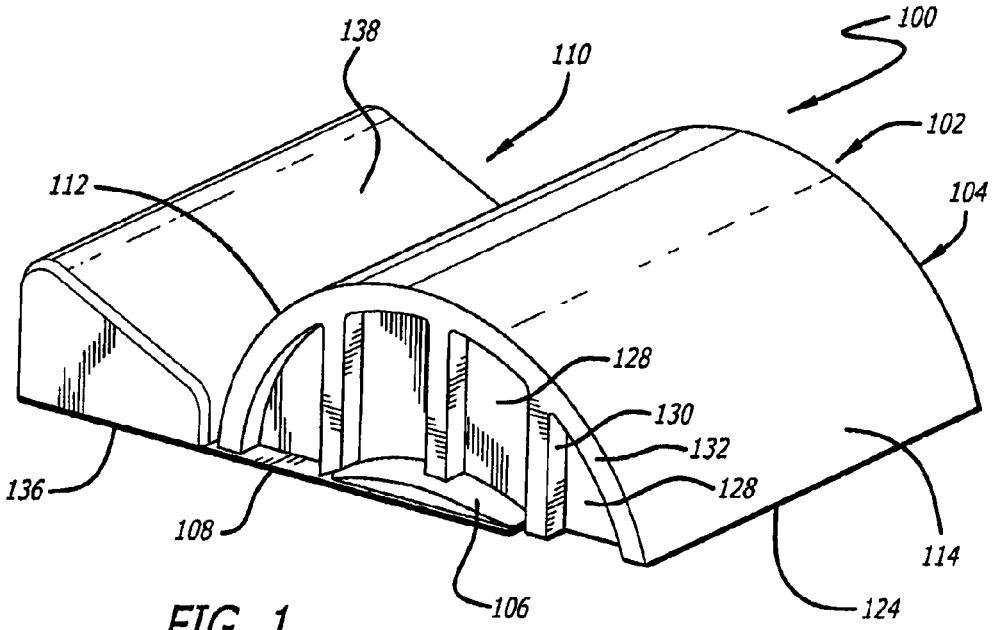
FIG. 1 is an upper perspective view of the assembled exercise apparatus of the present disclosure.

An upper perspective view of one embodiment of an exercise apparatus assembly 100 in accordance with the present disclosure is shown in FIG. 1. The apparatus assembly 100 is based on a partial barrel shaped body 102. This partial barrel shaped body, i.e. partial barrel 102, has a unique shape. It has a uniquely composite upper outer surface 104. The partial barrel 102 preferably rests on a support surface over a small, elongated partially cylindrical locating member 106 preferably placed at or adjacent one end of a support pad 108. The support pad 108, in turn, is designed to rest on a flat support surface such as a floor (not shown).

Figure 2:
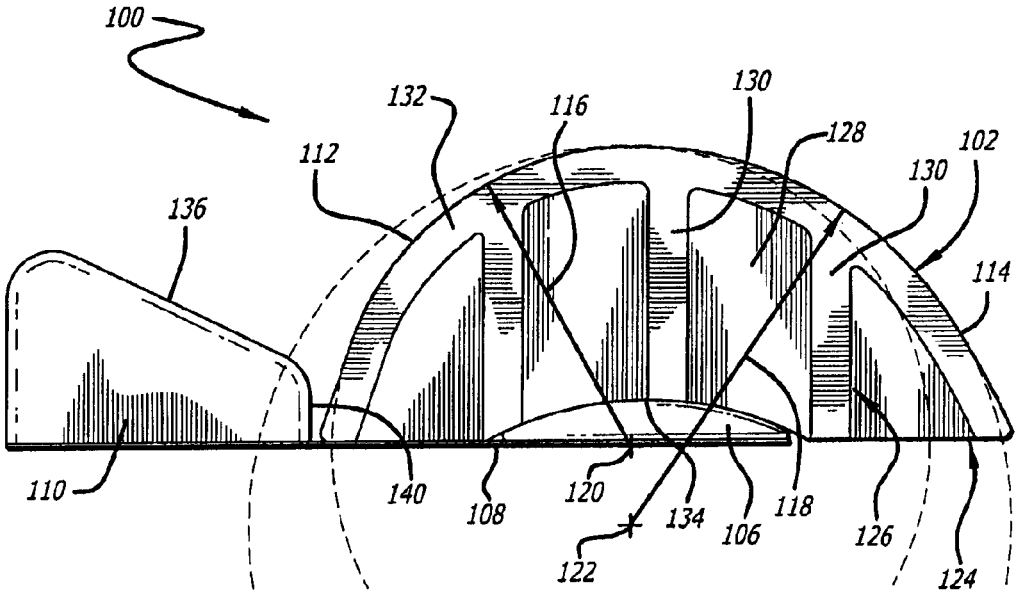
FIG. 2 is side view of the assembled apparatus shown in FIG. 1.

A removable step block 110 is removably positioned preferably on the pad 108 adjacent one side of the partial barrel 102 as is shown in FIGS. 1 and 2. The barrel 102 and step block 110 may be utilized together on any non-slip surface, such as carpet, without the use of the partial cylindrical locating member 106 on the pad 108. In addition, the partial barrel may be used separately from the step block 110, depending on the exercise being performed. However, use of the pad 108 and locating member 106 beneath the barrel 102 and step 110 is preferred, as together the assembly 100, or the barrel 102 alone, may be placed on any surface such as a hardwood floor without the barrel 102 or step body 110 moving out of position.

The upper outer surface 104 of the partial barrel 102 is formed by two arcuate surfaces 112 and 114 that have different radii 116 and 118 from parallel axes 120 and 122 respectively. The surfaces 112 and 114 preferably tangentially merge together preferably along a top of the surface 104 preferably along a vertical plane through and defined by the axes 120 and 122. The outer surface 104 terminates at a flat bottom surface 124 of the barrel 102. This vertical plane is perpendicular to a plane of the bottom surface 124 as is shown in FIG. 2.

The partial barrel 102 has two opposite, preferably identical, vertical end surfaces 126. Each end surface 126 has a plurality of spaced recesses 128 forming vertical ribs 130 between them each terminating in a curved rim 132 that joins with the outer surface 104. The vertical ribs 130 together with the curved rim 132 form a series of hand grip ledges in each end surface 126 for a user to grasp while performing certain exercises on the partial barrel 102 or, alternatively, on the assembled apparatus 100.

The bottom surface 124 of the partial barrel 102 preferably has an arcuate recess 134 extending along its length having a shape generally complementary to that of the locating member 106. This recess 134 preferably has a curved shape extending parallel to axes 120 and 122 and has a depth such that, when the locating member 106 is placed in the recess 134, the bottom of the locating member 106 lies in a common plane with that of the bottom 124. Thus, when the locating member is placed on the pad 108 as shown in FIGS. 1 and 2, the partial barrel 102 may be positioned as shown, or, reversed to an opposite orientation, such that surface 114 is adjacent the step block 110 rather than the surface portion 112 being adjacent the step block 110.

The step block 110 has a generally flat bottom 136, a slanted top surface 138, and an upright front wall 140 that is designed to be placed adjacent either the portion 112 or portion 114 of the upper surface 104 of the partial barrel 102. Thus generally, step block 110 is a trapezoidal block with preferably rounded corners above the flat bottom 136.

Figure 3:
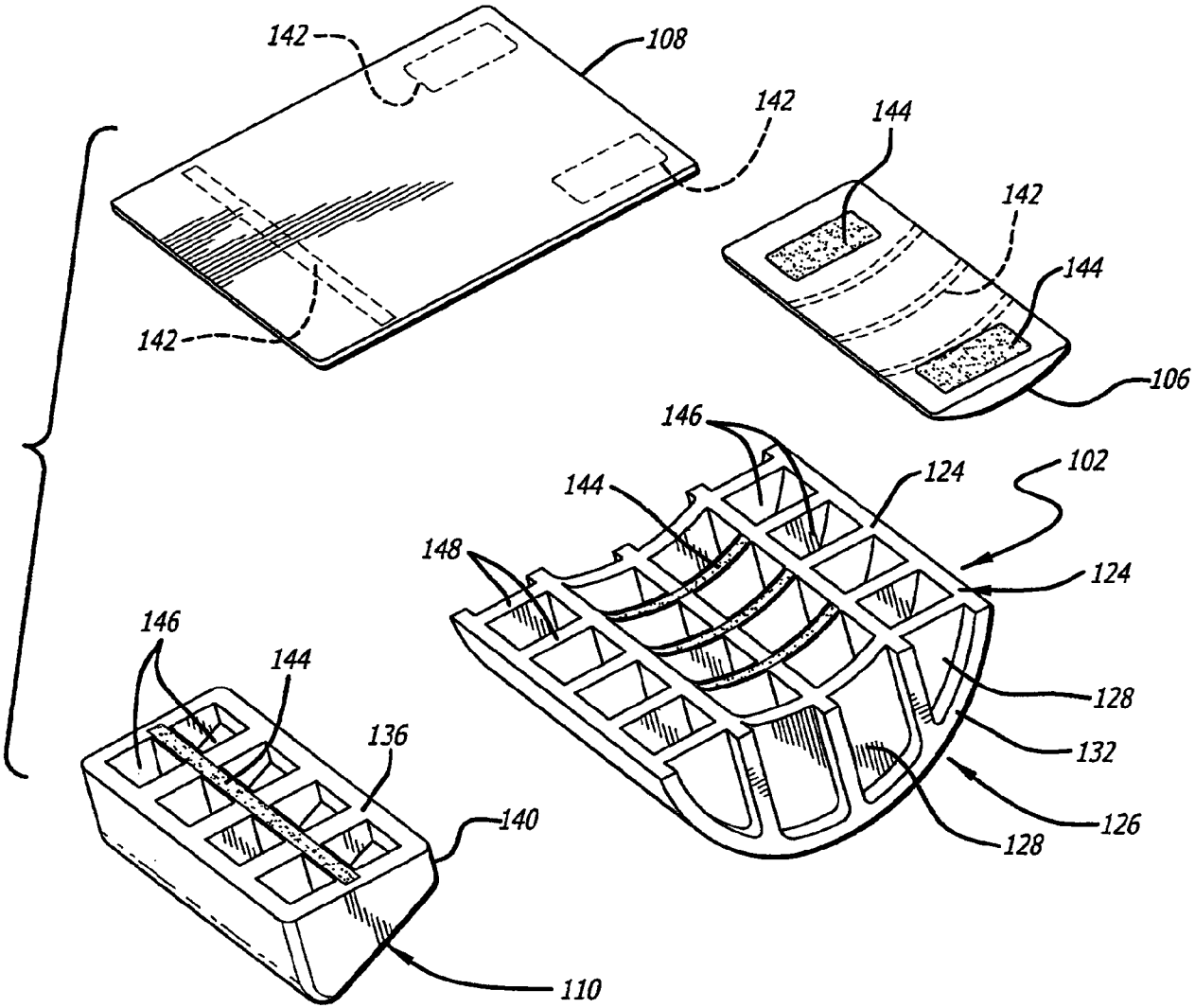
FIG. 3 is an exploded bottom perspective view of the apparatus shown in FIG. 1.

The partial barrel 102 and the step block 110 are shown inverted in the exploded view of the assembly 100 in FIG. 3. One or more of the component bodies 102, 106, 108, and 110 that make up the assembly 100 may be provided with complementary hook and loop fabric patches, strips or regions 142 and 144 on the mating surfaces so that, when the block 110 and locating member 108 are positioned on the pad 108, the block 110 and locating member 106 are removably held in place. Additionally strips 142 and 144 may optionally be provided on the upper surface of the locating member 106 and in corresponding portions of the recess 134 to hold the locating member 106 and partial barrel 102 together.

The step block 110 and the partial barrel 102 are each preferably injection molded or blow-molded from a suitable thermoplastic material. As can readily be seen in FIG. 3, both the step block 110 and the partial barrel 102 have an array of internal void spaces or recesses 146 forming intersecting ribs 148. These ribs 148 provide structural support for the upper surfaces and side walls of the block 110 and partial barrel 102 while the voids may be required for uniform cooling during injection molding of each of the bodies 110 and 102. Although not shown, similar voids may be formed in the locating member 106. Preferably each of the components of the assembled exercise apparatus 100 is made of a lightweight plastic material.

The apparatus 100 may be constructed other than as specifically shown. For example, the upright side of the step block 110 and lateral edges of the partial barrel 102 may have hook and loop fabric adhered to their surfaces such that the step block 110 may be removably fastened together with the partial barrel 102. The entire underside surfaces of the step block 110, the partial barrel 102 and the locating member 106 may covered in fastener material 142 while the upper surface of the pad 108 is entirely covered in mating fastener material 144 rather than utilizing strips and patches as illustrated. Other removable adhesive materials may be used, or the mating surfaces provided simply with non-slip material on the edges and surfaces to minimize shifting of the bodies during use.

Alternatively, the locating member 106 may have a different cross sectional shape than the arcuate shape as shown. The locating member 106 may have a rectangular, triangular, trapezoidal or other polygonal cross sectional shape, for example. In addition, the locating member 106 may be integrally formed on the pad 108 rather than as a separate body.

The end surfaces 126 of the partial barrel 102 are shown as having four recesses 128 and thus three ribs 130. Depending on the overall width of the partial barrel 102, additional, or fewer ribs may be provided. Preferably the ribs should be between three and four inches apart.

The locating member 106 may optionally be formed of a flexible resilient material that serves a dual function: that of a location member as above described, and as an integral head support for a user using the base mat 108 as a Pilates exercise mat without the partial barrel 102 and step block 110 in place. Accordingly, the base 108 may be a full size mat, typically about six feet in length, or may be a short mat as shown in the Figures and described above.

The simplest version of the partial barrel 102 is simply a curved plastic body having the composite upper surface 104 as above described. Such a simple version may be formed of a single sheet of rigid plastic that may or may not require a supporting rib beneath the upper surface 104, but will have two surface portions 112 and 114 as above described with different radii of curvature.

Figures 4, 5:
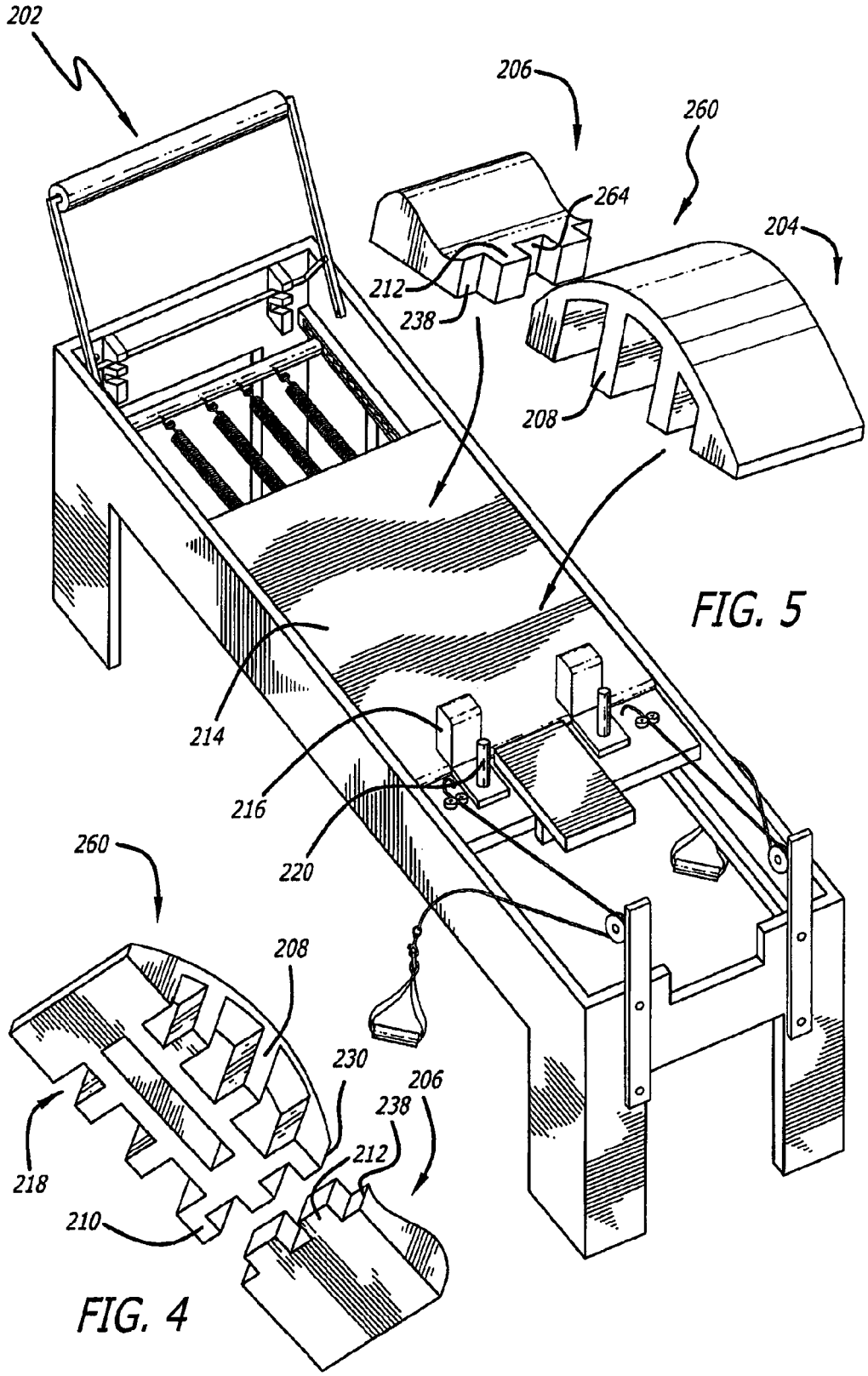
FIG. 4 is an exploded bottom perspective view of an alternative embodiment of the exercise apparatus of the present disclosure.
FIG. 5 is an exploded top perspective view of the alternative embodiment of the exercise apparatus of FIG. 4 shown in conjunction with a reformer.
Figure 6:
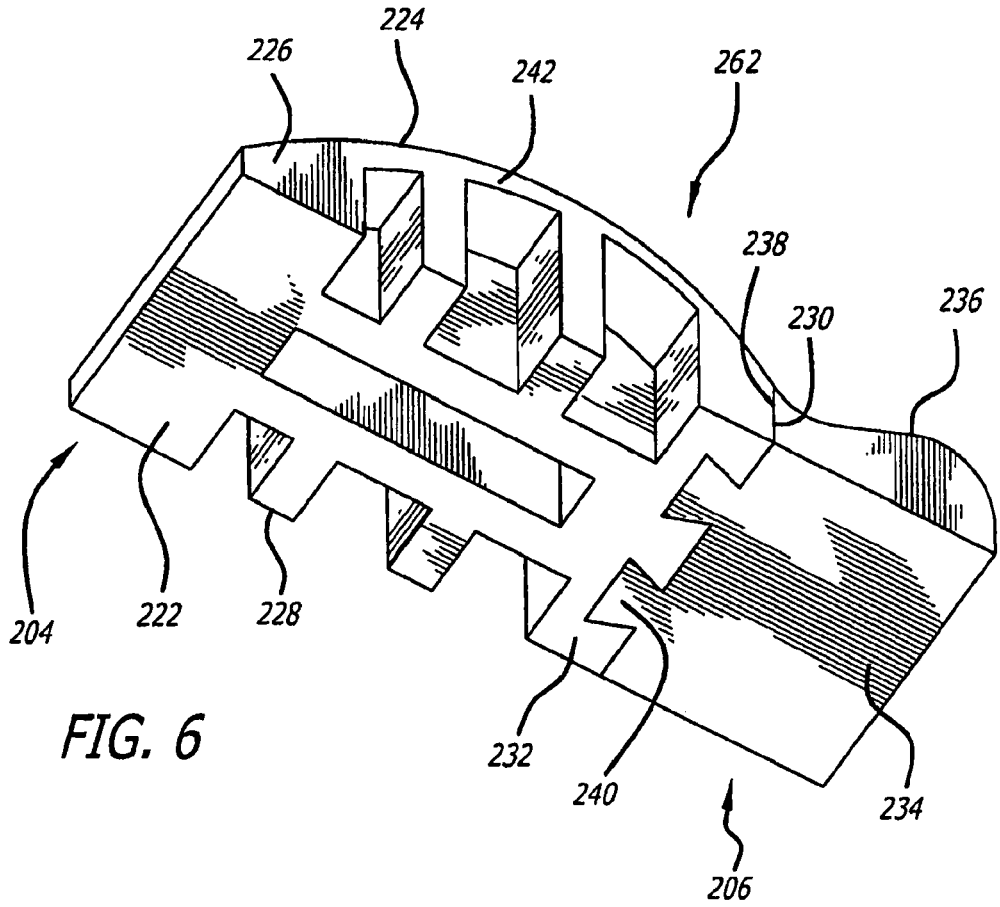
FIG. 6 is a bottom perspective view of another embodiment of the assembled exercise apparatus of the present disclosure.

An exploded perspective view of another embodiment of an exercise apparatus assembly 260 in accordance with the present disclosure is shown in FIG. 5. The apparatus assembly 260 is based on a partial cylindrical barrel shaped body 204 and a removable step block 206. The partial cylindrical barrel shaped body, i.e. partial barrel body 204, preferably rests on a flat support surface, such as a floor or a movable carriage 214 of a reformer exercise apparatus 202. As shown in FIG. 4, an upright front wall 238 of the step block 206 is removably connected to a rear wall 230 of the partial barrel body 204. The rear wall 230 of the partial barrel body 204 and upright front wall 238 of the step block 206 each includes one or more recesses 264 to form a tongue and groove configuration 210 and a mating complementary tongue and groove configuration 212, respectively, as shown in FIG. 4. Connection is established through engagement of the tongue and groove configuration 210 with the complimentary tongue and groove configuration 212. In one alternative embodiment, as shown in FIG. 6, the tongue and groove configurations 232, 240 of an exercise apparatus assembly 262 are dovetail configurations. This configuration prevents separation of the connected step block 206 from the partial barrel body 204 in a horizontal direction parallel to the flat support surface.

As shown in FIGS. 4 and 5, the partial barrel body 204 has two opposite, preferably identical, vertical end surfaces 226, 228. Each end surface has a plurality of spaced recesses 218 forming vertical ribs 208 between them, each terminating in a curved rim 242 that joins with the outer surface 224. The end surfaces 226, 228 of the partial barrel 204 are shown as having three recesses 218 and thus two ribs 208. Depending on the overall width of the partial barrel 204, additional, or fewer ribs may be provided. In at least one embodiment, the vertical ribs 208 together with the curved rim 242 form a series of hand grip ledges in each end surface 226, 228 for a user to grasp while performing certain exercises on the partial barrel body 204 or, alternatively, on the assembled apparatus. In other embodiments, the recesses 218 allow for the insertion of shoulder stops 216 and posts 220 located on an exercise carriage 214. Insertion of the shoulder stops 216 and/or posts 220 secures the partial barrel body 204 and connected step block 206 on the exercise carriage 214. The partial barrel body 204 may be preferably positioned on a reformer 202 as indicated by the arrows in FIG. 5.

Figure 7:
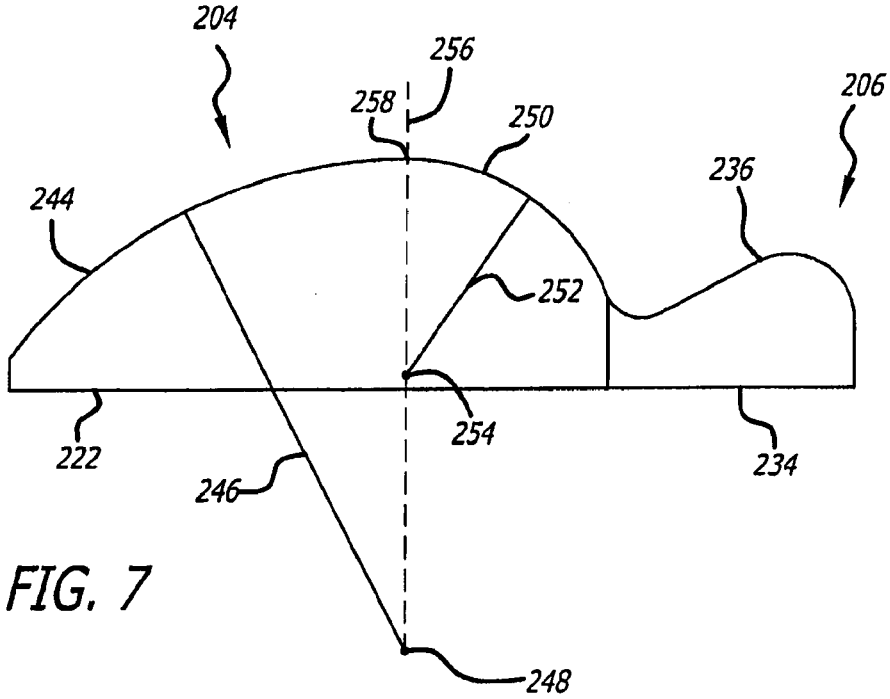
FIG. 7 is a side representation of the exercise apparatus shown in FIGS. 4-6.

As shown in FIG. 7, the upper outer surface 224 of the partial barrel is formed by a first cylindrical surface portion 244 merged with a second cylindrical surface portion 250. Preferably, the two cylindrical surface portions 244, 250 together form a continuous smooth curved surface. The first surface portion 224 has a first radius of curvature 246 about a first axis 248 and the second surface portion 250 has a second radius of curvature 252 about a second axis 254. The second axis 254 is parallel to the first axis 248 and together they define a plane 256 through a line of intersection 258 of the first and second cylindrical surface portions. Though plane 256 is shown in FIG. 7 to be approximately perpendicular to the bottom surface 222, plane 256 may be any angle depending on the radii of curvatures of the first and second surface portions.

The step block 206 has a generally flat bottom 234, a top surface 236, and an upright front wall 238. The upright front wall 238 has at least one recess 264 to form a tongue and groove configuration 212 complimentary to the tongue and groove configuration 210 of the rear wall 230 of the partial barrel body 204. The top surface 236 may be curved or flat. In some embodiments, as shown in FIG. 5, the top surface 236 has both a convex and concave curvature, similar to a recurve bow shape. In other embodiments, the top surface may be flat and slanted at an angle to the flat bottom. In alternative embodiments, the step block 110, 206 may have a trapezoidal block shape with preferably rounded corners above the flat bottom. Preferably, the top surface 236 of the step block 206 forms a continuous smooth surface with the upper surface 224 of the partial barrel 204 when they are connected.

While the apparatus has been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. An exercise apparatus comprising:

a curved partial cylindrical barrel shaped body having a bottom surface, an upper curved surface, a first end face, a second end face, and a rear wall between the bottom surface and upper curved surface, said upper curved surface including a first cylindrical surface portion merging with a second cylindrical surface portion forming a continuous smooth curved surface, the first surface portion having a first radius of curvature about a first axis, the second surface portion having a second radius of curvature about a second axis parallel to the first axis, wherein the first radius of curvature is different from the second radius of curvature and the first and second axes together define a plane through a line of intersection of the first and second cylindrical surface portions, and said rear wall having at least one recess to form a tongue and groove configuration;

a removable step block having a bottom surface, a top surface, and an upright front wall between the bottom surface and the top surface, said upright front wall having at least one recess to form a mating complementary tongue and groove configuration to engage the tongue and groove configuration of the rear wall of the curved partial cylindrical barrel shaped body;

said step block removably connected to the partial cylindrical barrel body through engagement of the tongue and groove configuration of the rear wall of the curved partial cylindrical barrel shaped body with the complementary tongue and groove configuration of the upright front wall of the step block; and wherein the top surface of the step block forms a continuous smooth surface with the upper surface of the partial cylindrical barrel shaped body and the first end face and the second end face each has a plurality of parallel spaced recesses extending perpendicular to the bottom surface defining a plurality of vertical ribs therebetween.

2. The apparatus of claim 1 wherein the tongue and groove configuration removably connecting the upright front wall of the step block to the rear wall of the partial cylindrical barrel shaped body is a dovetail configuration.

3. The [device] *apparatus* of claim 1 wherein each end face of the body each has a curved rim joining the end face to the upper curved surface of the body.

4. An exercise apparatus comprising:

a curved partial cylindrical barrel shaped body having a bottom surface, an upper curved surface, a first end face, a second end face, and a rear wall between the bottom surface and upper curved surface, and said rear wall having at least one recess to form a tongue and groove configuration;

a removable step block having a bottom surface, a top surface, and an upright front wall between the bottom surface and the top surface, said upright front wall having at least one recess to form a mating complementary tongue and groove configuration to engage the tongue and groove configuration of the rear wall of the curved partial cylindrical barrel shaped body;

said step block removably connectable to the partial cylindrical barrel body through engagement of the tongue and groove configuration of the rear wall of the curved partial cylindrical barrel shaped body with the complementary tongue and groove configuration of the upright front wall of the step block; and wherein the first end face and the second end face each has a plurality of parallel spaced recesses extending perpendicular to the bottom surface defining a plurality of vertical ribs therebetween.

5. The apparatus of claim 4 wherein the tongue and groove configuration removably connecting the upright front wall of the step block to the rear wall of the partial cylindrical barrel shaped body is a dovetail configuration.

6. The apparatus of claim 4 wherein the top surface of the step block forms a continuous smooth surface with the upper surface of the partial cylindrical barrel shaped body.

7. The [device] *apparatus* of claim 4 wherein each end face of the body each has a curved rim joining the end face to the upper curved surface of the body.

8. An exercise apparatus comprising:

a curved partial cylindrical barrel shaped body having a bottom surface, an upper curved surface, a first end face, a second end face, and a rear wall between the bottom surface and upper curved surface, and said rear wall having at least one recess to form a tongue and groove configuration;

a removable step block having a bottom surface, a top surface, and an upright front wall between the bottom surface and the top surface, said upright front wall having at least one recess to form a mating complementary tongue and groove configuration to engage the tongue and groove configuration of the rear wall of the curved partial cylindrical barrel shaped body;

said step block being removably connectable to the partial cylindrical barrel body through engagement of the tongue and groove configuration of the rear wall of the body with the complementary tongue and groove configuration of the upright front wall of the step block to prevent disengagement of the step block from the body in at least one direction; and wherein each end face of the body each has a curved rim joining the end face to the upper curved surface of the body and the first end face and the second end face each has a plurality of parallel spaced recesses extending perpendicular to the bottom surface defining a plurality of vertical ribs therebetween.

9. The apparatus of claim 8 wherein the tongue and groove configuration removably connecting the upright front wall of the step block to the rear wall of the partial cylindrical barrel shaped body is a dovetail configuration.

10. The apparatus of claim 8 wherein the top surface of the step block forms a continuous smooth surface with the upper surface of the partial cylindrical barrel shaped body.

11. An exercise apparatus comprising: a curved partial cylindrical barrel shaped body having a bottom surface, an upper curved surface, a first end face, a second end face, and a rear wall between the bottom surface and upper curved surface, wherein the first end face and the second end face each define at least two spaced recesses extending perpendicular to the bottom surface defining at least one vertical rib therebetween, and said rear wall having at least one recess to form a portion of a dovetail tongue and groove configuration therein; a removable step block having a bottom surface, a top surface, and an upright front wall between the bottom surface and the top surface, said upright front wall having at least one mating complementary shaped dovetail tongue and groove portion to engage the at least a portion of the dovetail tongue and groove configuration of the rear wall of the curved partial cylindrical barrel shaped body; wherein said step block is removably connected to the partial cylindrical barrel body through engagement of the dovetail tongue and groove configuration of the rear wall of the curved partial cylindrical barrel shaped body with the complementary dovetail tongue and groove configuration of the upright front wall of the step block.

*12. An exercise apparatus comprising:*

*a curved partial cylindrical barrel shaped body having a bottom surface adapted to be positioned on a flat support surface, an upper curved surface, a first end face, a second end face, and a rear wall between the bottom surface and upper curved surface, and said rear wall having at least one recess to form a tongue and groove configuration;*

*a removable step block having a bottom surface, a top surface, and an upright front wall between the bottom surface and the top surface, said upright front wall having at least one recess to form a mating complementary tongue and groove configuration engaging the tongue and groove configuration of the rear wall of the curved partial cylindrical barrel shaped body and preventing separation of the step block from the partial cylindrical barrel body by movement in a direction parallel to the flat support surface, wherein the tongue and groove configuration removably connecting the upright front wall of the step block to the rear wall of the partial cylindrical barrel shaped body is a dovetail configuration.*

*13. The apparatus of claim 12 wherein each end face of the body each has a curved rim joining the end face to the upper curved surface of the body.*

*14. The apparatus of claim 12 wherein the upper surface of the step block has a recurve shape forming a continuous smooth surface mating the upper surface of the partial cylindrical barrel shaped body when the body and step block are connected.*

*15. The apparatus of claim 12 wherein the engagement precludes disengagement of the step block from the body in at least one direction parallel to the bottom surface of the partial barrel shaped body.*

*16. The apparatus of claim 15 wherein the top surface of the step block forms a continuous smooth surface with the upper surface of the partial cylindrical barrel shaped body.*

*17. The apparatus of claim 12 wherein the top surface of the step block forms a continuous smooth recurve surface mating with the upper surface of the partial cylindrical barrel shaped body and the first end face.*

*18. The apparatus of claim 12 wherein the second end face each has a plurality of parallel spaced recesses extending perpendicular to the bottom surface defining a plurality of vertical ribs therebetween.*

* * * * *